United States Patent [19]

Kihara

[11] Patent Number: 5,768,236
[45] Date of Patent: Jun. 16, 1998

[54] RECORDING AND REPRODUCING APPARATUS AND METHOD USING A BUFFER MEMORY TO ENSURE CONTINUOUS OUTPUT DURING TRACK JUMPS CAUSED BY EITHER VIBRATION OR FAST REPRODUCTION MODE

[75] Inventor: Nobuyuki Kihara, Tokyo, Japan

[73] Assignee: Sony Corporation, Tokyo, Japan

[21] Appl. No.: 540,676

[22] Filed: Oct. 11, 1995

[30] Foreign Application Priority Data

Oct. 19, 1994 [JP] Japan ................................ 6-278635

[51] Int. Cl.$^6$ ............................ G11B 17/22; G11B 11/00
[52] U.S. Cl. ............................ 369/60; 369/13; 369/32
[58] Field of Search ............................ 369/32, 60, 13; 360/32, 51, 69, 71, 73.01; 386/68, 81

[56] References Cited

U.S. PATENT DOCUMENTS 5,491,592 2/1996 Arakami et al. ................ 360/32
5,553,055 9/1996 Yokota et al. ................ 360/48

*Primary Examiner*—Aristotelis M. Psitos
*Assistant Examiner*—Regina Y. Neal
*Attorney, Agent, or Firm*—Limbach & Limbach L.L.P.

[57] ABSTRACT

A reproducing apparatus for a recording medium such as an optical disk, includes a head, a memory, and a controller. The head is relatively moved with respect to the recording medium so as to read audio data recorded on the recording medium. The memory temporarily stores the audio data read from the recording medium. The controller controls to write the audio data into the memory and to read the audio data stored in the memory. The controller controls to write the audio data into the memory and to read the audio data therefrom in such a manner that a writing speed of the audio data read by the head becomes higher than a reading speed of the audio data stored in the memory. When a highspeed reproducing operation condition is set, the controller intermittently reads the data from a position separated from a preselected address by using the audio data previously stored in the memory, so that a highspeed reproducing operation process is executed. Also, after the highspeed reproducing operation process based on the audio data previously stored in the memory has been complete, the controller relatively transports the head at a high speed with respect to the recording medium, whereby the highspeed reproducing operation process for the audio data, which is read out from the recording medium to be written into the memory is carried out.

15 Claims, 13 Drawing Sheets

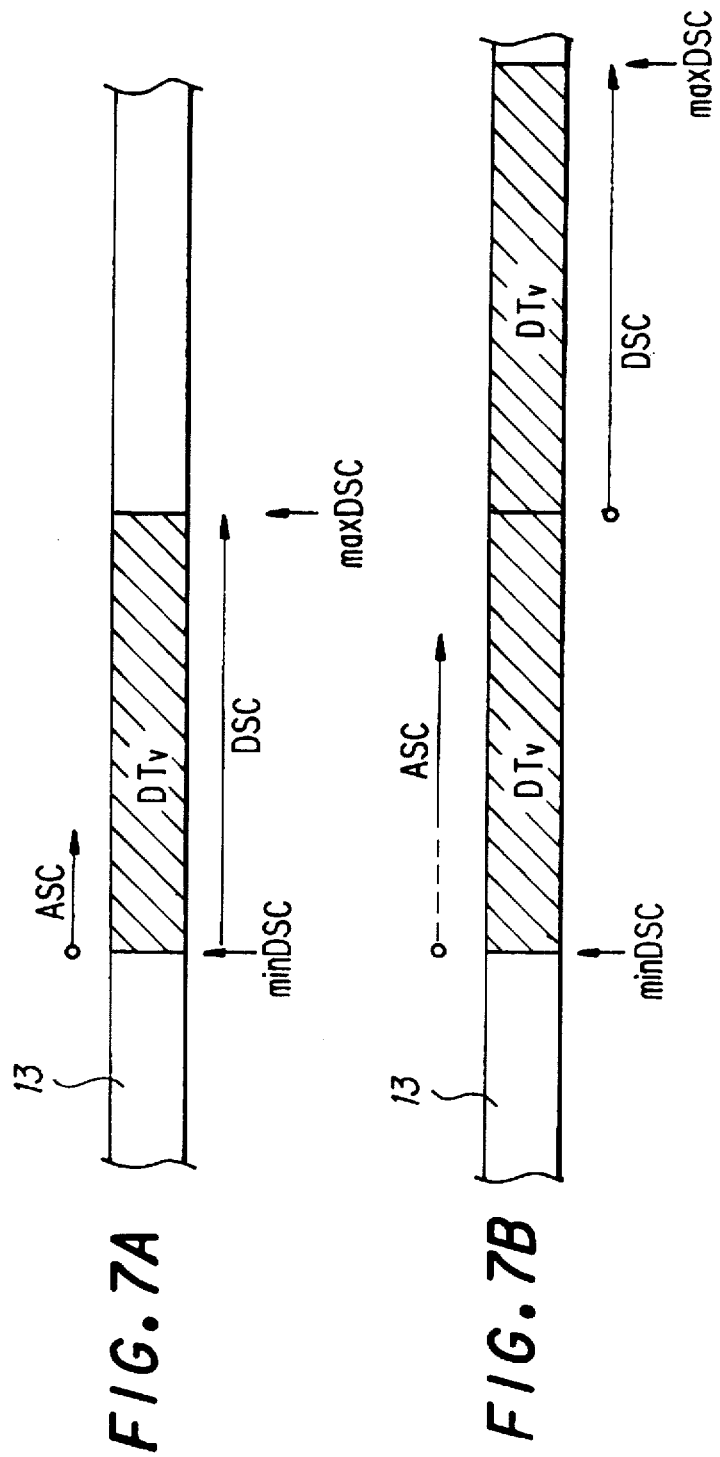

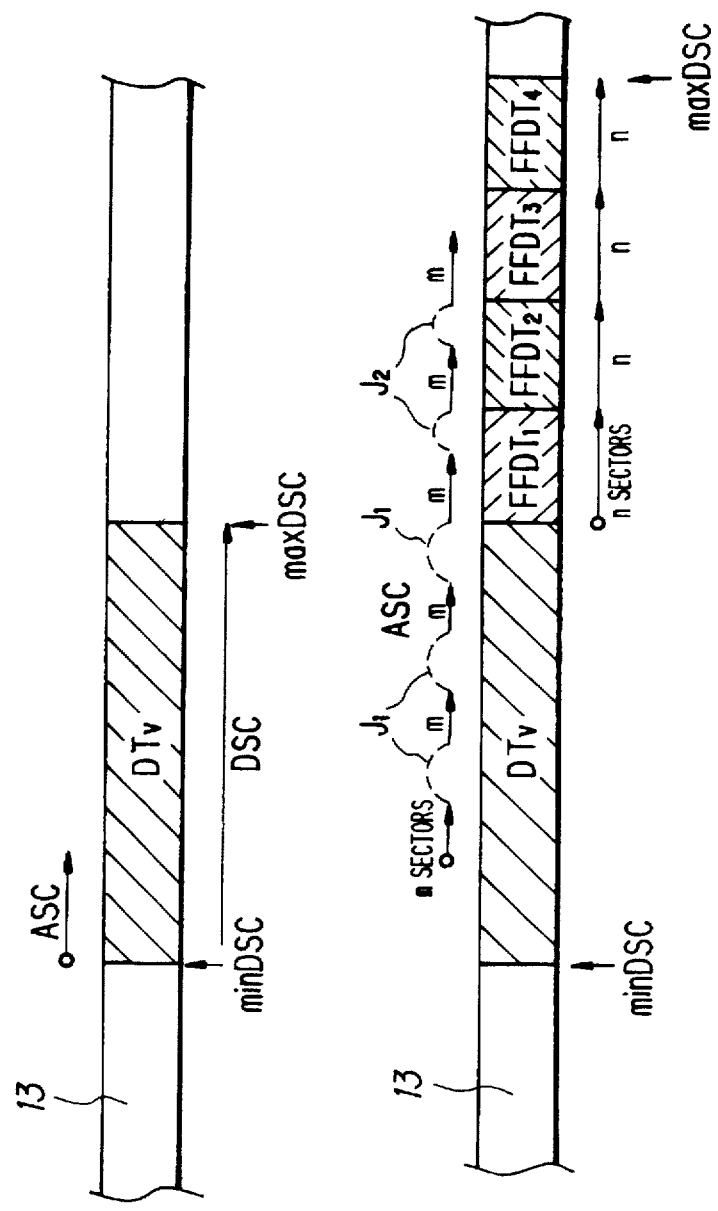

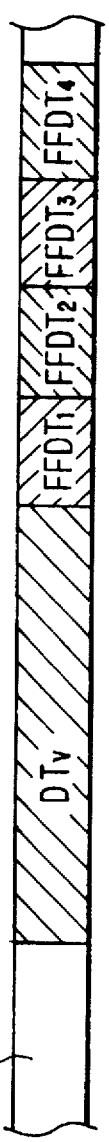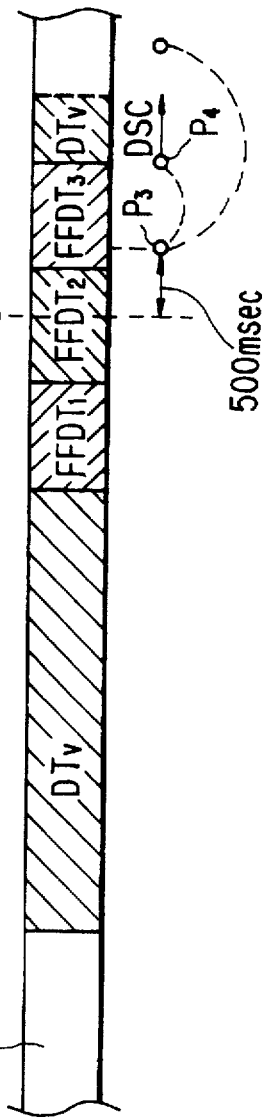
FIG. 10A
FIG. 10B

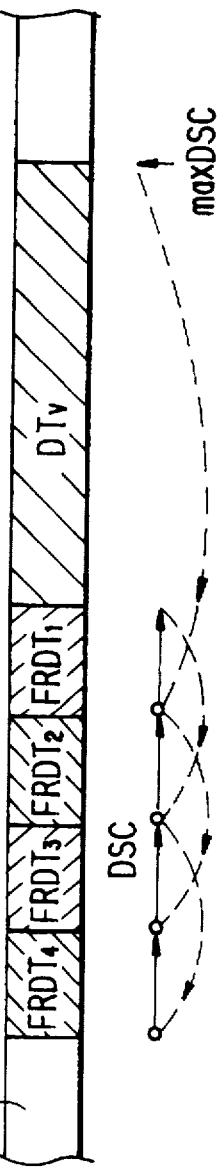
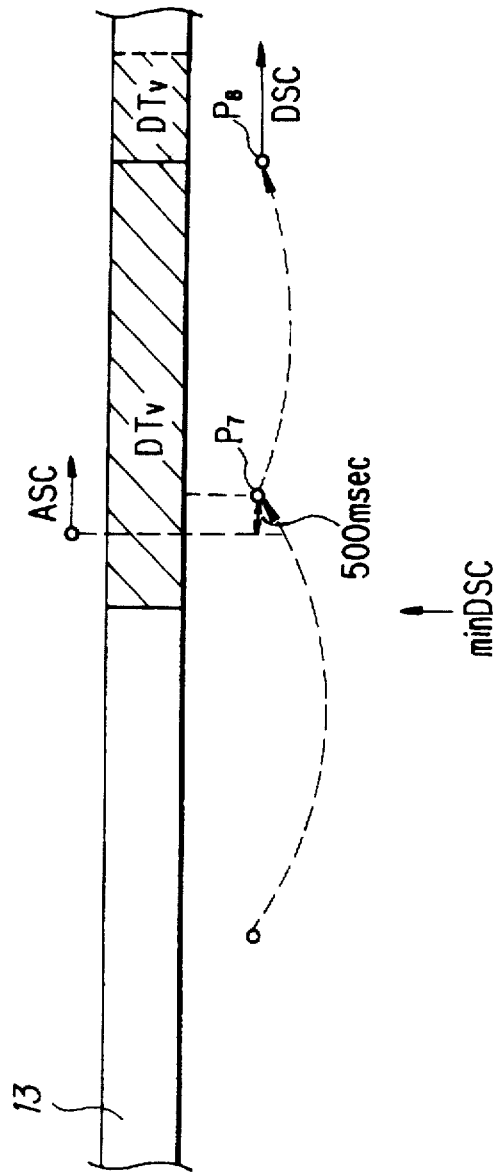
FIG. 12A
FIG. 12B

RECORDING AND REPRODUCING APPARATUS AND METHOD USING A BUFFER MEMORY TO ENSURE CONTINUOUS OUTPUT DURING TRACK JUMPS CAUSED BY EITHER VIBRATION OR FAST REPRODUCTION MODE

BACKGROUND OF THE INVENTION

1. Field of the Invention

The present invention relates to a method and an apparatus for reproducing a recording medium. More specifically, the present invention is directed to a method and an apparatus for reproducing a recording medium with a memory used to temporarily store therein data read out from a recording medium.

2. Background of the Invention

Conventionally, in such an apparatus a data rewriteable magneto optical disk is employed as a recording medium, on which music data and the like can be recorded by a user, and data read out from the magneto optical disk is once stored into a memory.

In order to render, a recording and/or reproducing apparatus capable of recording and/or reproducing a magneto optical disk less sensitive to vibration, audio data read from the magneto optical disk is intermittently written into a buffer memory at a high transfer rate during the reproducing operation, whereas the audio data is continuously read out from the buffer memory at a low transfer rate to be demodulated as an audio (sound) reproduction signal. At this time, a certain data amount of audio data is being stored in the buffer memory. Accordingly, even when a track jump happens to occur due to applications of external vibrations to the recording and/or reproducing apparatus and thus the reading operation of the audio data from the magneto optical disk is temporarily interrupted, the audio data can be continuously read from the buffer memory. As a result, the reproduced sounds are outputted without any interruption.

During the recording operation, the input data is continuously, temporarily stored into the buffer memory at a low transfer rate, and then is intermittently read from this buffer memory at a high transfer rate to be supplied to the recording head, so that the read audio data is recorded on the disk.

In a recording track of a magneto optical disk functioning as the recording medium of the above-described recording and/or reproducing apparatus, as illustrated in FIG. 1, clusters CL (=36 sectors) are continuously formed, each of which is constituted by a sub-data region of 4 sectors (1 sector=2,352 bytes) and a main data region of 32 sectors. 1 cluster is used as a minimum unit during the recording operation. 1 cluster corresponds to tracks provided on 2 to 3 circumferences of the disk. It should be noted that an address is recorded every 1 sector.

The sub-data region of 4 sectors is employed as sub-data and a linking area. TOC (Table of Contents) data, and audio data are recorded on the main data region of 32 sectors.

A sector is further subdivided into sound groups, and two sectors are subdivided into 11 sound groups. Within a sound group of 424 bytes, data is separated into an L-channel and a R-channel to be recorded. 1 sound group becomes such an audio data amount equal to 11.6 msec. 212 bytes for constituting either the L-channel region, or the R-channel region is called as a "sound frame".

When data is recorded and/or reproduced via the buffer memory, which has been recorded in such a format on the disk, the data is stored in a sector unit into the buffer memory. That is, the sector address is combined with the byte address (0 to 2351 bytes) within the sector to produce an access address, so that both the data write/read operations are performed.

In the above-described recording and/or reproducing apparatus, a fast-forward (FF) reproducing operation and a fast-return (FR) reproducing operation can be performed in addition to the normal reproducing operation. However, when the operation is switched between the normal reproducing operation and the fast-forward reproducing operation, and also between the normal reproducing operation and the fast-return reproducing operation, output sounds would be interrupted. Namely, a so-called "sound interruption" happens to occur. Thus, there is a problem that rhythmical operation feelings could not be obtained.

For example, during the fast-forward reproducing operation and the fast-return reproducing operation, the audio data are read from the disk for the fast-forward reproduction, or the fast-return reproduction, and then are stored into the buffer memory. These audio data are read from the buffer memory to be reproduced. The audio data read from the disk for the fast-forward reproduction, or the fast-return reproduction implies such temporally interrupted data produced by for example, the data of several sectors which have been read, and thereafter several tracks jumped over, and then the data of several sectors are read. After the data have been once stored into the buffer memory, these data are sequentially read from the buffer memory, so that the sounds are outputted as the sound outputs corresponding to either the fast-forward reproduction, or the fast-return reproduction. However, when the operation is changed from the fast-forward reproduction, or the fast-return reproduction into the normal reproduction, the transfer operation of the data which have been stored in the buffer memory for the above purposes is interrupted, and then the data for the normal reproduction must be newly read from the disk to be stored into the buffer memory. The data for the normal reproduction implies such temporally continued data.

Accordingly, when the operation is switched from either the fast-forward reproduction, or the fast-return reproduction into the normal reproduction, the data reading operation from the buffer memory for the above purpose is interrupted. Thereafter, the data for the normal reproduction is read from the disk, and a certain amount of data for the normal reproduction is stored in the buffer memory. Then, the newly stored data for the normal reproduction is read from the buffer memory, so that the reproduced sound output is commenced, during which the sounds are intermittently reproduced.

Also, when the operation is switched from the normal reproduction into either the fast-forward reproduction, or the fast-return reproduction, the transfer operation of the data for the normal reproduction from the buffer memory is interrupted. Thereafter, the data for the fast-forward reproduction, or the fast-return reproduction is read from the disk, and a certain amount of data is stored into the buffer memory. Then, since the data for the fast-forward reproduction, or the fast-return reproduction is newly read from the buffer memory, either fast-forward reproduced sounds, or fast-return reproduced sounds can be newly outputted, during which the sounds are interrupted accordingly.

SUMMARY OF THE INVENTION

It is therefore an object of the present invention to provide a reproducing apparatus for a recording medium which resolves the above-mentioned problem.

It is another object of the present invention to provide a method for reproducing a recording medium which resolves the above-mentioned problem.

According to present invention, there is provided a reproducing apparatus for a recording medium including a reading unit, a memory and a controller. The reading unit is relatively moved with respect to the recording medium so as to read audio data recorded on the recording medium. The memory temporarily stores the audio data read from the recording medium. The controller controls to write the audio data into the memory and to read the audio data stored in the memory. The controller controls to write the audio data into the memory and to read the audio data therefrom in such a manner that a writing speed of the audio data read by the reading unit becomes higher than a reading speed of the audio data stored in the memory. When a highspeed reproducing operation condition is set, the controller intermittently reads the data from a position separated from a preselected address by using the audio data previously stored in the memory, so that a highspeed reproducing operation process is executed. Also, after the highspeed reproducing operation process based on the audio data previously stored in the memory has been complete, the controller relatively transports the head at a high speed with respect to the recording medium, whereby the highspeed reproducing operation process of the audio data is carried out, which is read out from the recording medium to be written into the memory.

According to the present invention, there is provided a method for reproducing a recording medium. Audio data is recorded together with address data on a recording medium. The audio data read from the recording medium by a reading unit is once stored into memory. The audio data stored in the memory is read, and the audio data is written/read into/from the memory in such a manner that a writing speed of the audio data read out from the recording medium is higher than a reading speed of the audio data stored in the memory. When a highspeed reproducing operation condition is set, the reproducing method executes a highspeed reproducing operation process with employment of the audio data previously stored in the memory. The recording medium is relatively transported at a high speed with respect to the reading unit, whereby the audio data read by the reading unit is written into the memory with being continued to the audio data previously stored in the memory. After the highspeed reproducing operation process for the audio data previously stored in the memory is accomplished, the recording medium is relatively transported at a high speed with respect to the reading unit, whereby a highspeed reproducing operation process for the audio data which has been read from the recording medium and written into the memory is carried out.

BRIEF DESCRIPTION OF THE DRAWINGS

FIG. 7a and FIG. 7b are explanatory diagrams for describing operation of the buffer memory during the normal reproducing operation in the recording and/or reproducing apparatus according to the embodiment;

FIG. 8a and FIG. 8b are explanatory diagrams for describing operation of the buffer memory when the normal reproducing operation is changed to the fast-forward reproducing operation in the recording and/or reproducing apparatus according to the embodiment;

FIG. 10a and FIG. 10b are explanatory diagrams for describing a second operation example of the buffer memory when the fast-forward reproducing operation is changed to the normal reproducing operation in the recording and/or reproducing apparatus according to the embodiment;

FIG. 12a and FIG. 12b are explanatory diagrams for describing a third operation example of the buffer memory when the fast-return reproducing operation is changed to the normal reproducing operation in the recording and/or reproducing apparatus according to the embodiment.

DETAILED DESCRIPTION OF THE INVENTION

Referring now to drawings, an apparatus for reproducing a recording medium, according to the present invention, will be described in detail. It should be understood that as the recording medium, such a magneto optical disk on which audio (sound) data is recorded is employed, whereas as the apparatus, such a recording and/or reproducing apparatus with employment of the magneto optical disk is employed for the sake of explanations in the below-mentioned embodiments.

A description will be made of the following items in the following sequence;

1. Arrangement of recording and/or reproducing apparatus.
2. Audio (sound) data sector.
3. Storage region of buffer memory.
4. Operation during normal reproducing operation.
5. Operation when normal reproducing operation is changed into fast-forward reproducing operation.
6. Operation when fast-forward reproducing operation is changed into normal reproducing operation.
7. Operation when normal reproducing operation is changed into fast-return reproducing operation.
8. Operation when fast-return reproducing operation is changed into normal reproducing operation.

1. Arrangement of Recording and/or Preproducing Apparatus

Figure 2:
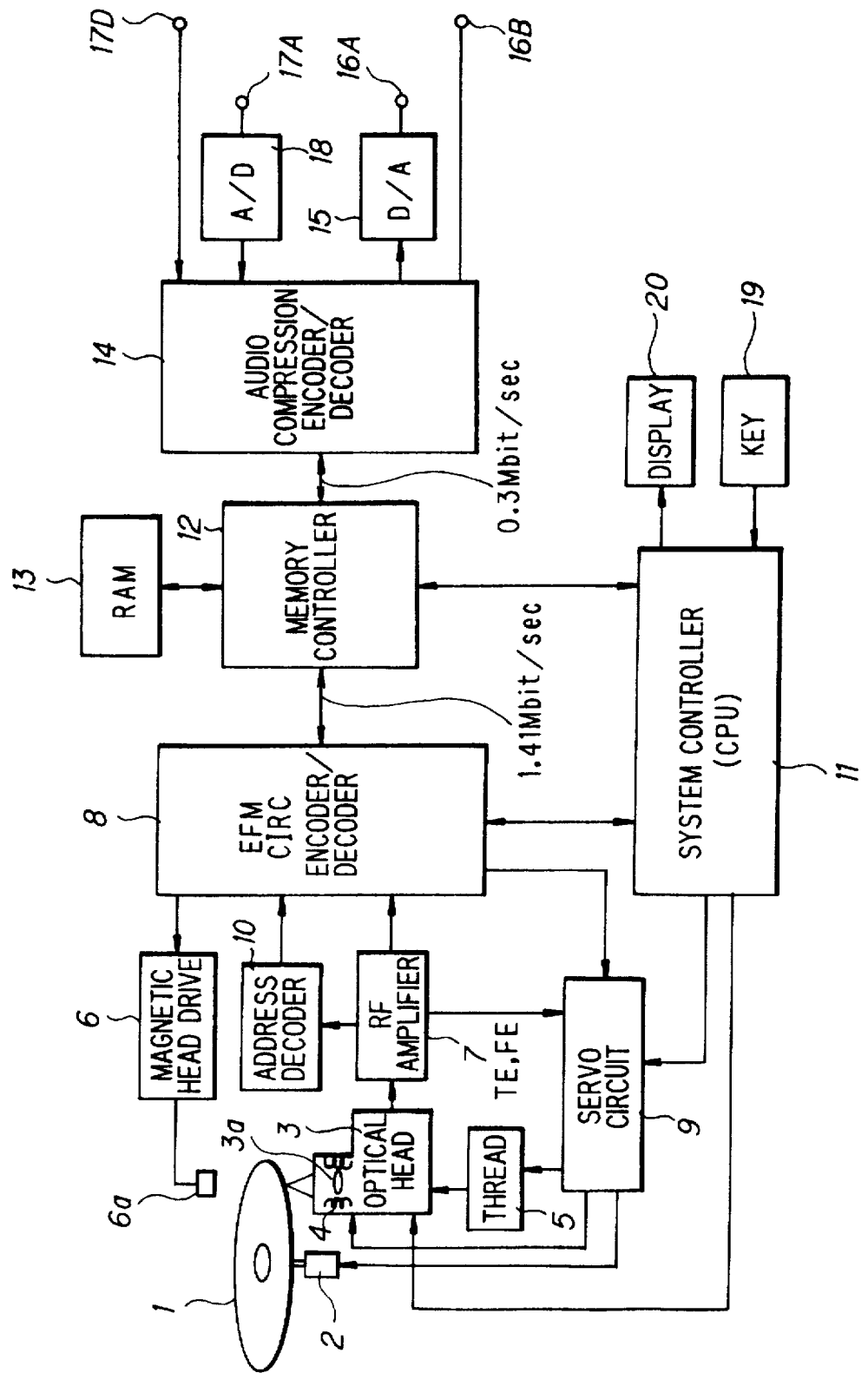
FIG. 2 is a schematic block diagram for indicating an arrangement of a recording and/or reproducing apparatus according to an embodiment of the present invention.

FIG. 2 is a schematic block diagram for showing a major portion of a recording and/or reproducing apparatus according to an embodiment of the present invention.

In FIG. 2, a magneto optical disk 1 on which, for instance, audio (sound) data is recorded is rotatably driven by a spindle motor 2. An optical head 3 irradiates an optical beam to the magneto optical disk 1 during the recording/reproducing operation. The optical head 3 irradiates to the disk 1, such a light beam having a high level used to heat a recording track up to the Curie temperature during the recording operation, whereas the optical head 3 irradiates to the disk 1, such a light beam having a relatively low level used to detect data from the reflection light from the disk 1 based on the magnetic Kerr effect during the reproducing operation.

To this end, the optical head 3 contains a laser diode functioning as a light source, an optical system constructed of a polarizing beam splitter and an objective lens 3a, and a detector for detecting reflection light. The objective lens 3a is held in such a way that this lens is displaceable by an actuator 4 along a disk redial direction as well as a direction along which this objective lens is positioned close to/apart from the disk.

A magnetic head 6a is located opposite to the optical head 3 by sandwiching the magneto optical disk 1, and this magnetic head 6a applies a vertical magnetic field modulated by the supplied data to the magneto optical disk 1. Both of the entire optical head 3 and the magnetic head 6a are transported by a feeding mechanism 5 along the radial direction of the disk 1.

During the reproducing operation, the information detected by the optical head 3 from the magneto optical disk 1 is supplied to an RF amplifier 7. The RF amplifier 7 extracts an RF signal, a tracking error signal, a focusing error signal, and absolute positional information by performing the calculation process of the supplied information. The absolute positional information is absolute positional information recorded on the magneto optical disk 1 as a pregroup (wobbling group). The RF signal outputted from the RF amplifier 7 is supplied to an encoder/decoder unit 8. Both of the tracking error signal and the focusing error signal, produced from the RF amplifier 7, are supplied to a servo circuit 9. The absolute positional information is supplied to an address decoder 10.

The servo circuit 9 produces various sorts of servo drive signals based on the tracking error signal and the focusing error signal supplied from the RF amplifier 7, and also a track jump instruction, an access instruction, and rotation speed detection information of the disk 1, which are derived from a system controller 11 arranged by a microcomputer. The servo circuit 9 controls the actuator 4 and the feeding mechanism 5 to perform a focus servo and a tracking servo. Based upon the rotation information from the disk 1, the servo circuit 9 controls the spindle motor 2 in the constant linear velocity (CLV) manner.

After the RF signal derived from the RF amplifier 7 is EFM-modulated and then decoded by way of the CIRC decoding process, the digital data outputted from the encoder/decoder unit 8 is once written into a buffer memory 13 by memory controller 12. The transfer data of the reproduced data in the signal system defined from the optical head 3 to the buffer memory 13, and also defined by the data readout operation from the magneto optical disk 1 by the optical head 3 is equal to 1.41M bit/sec, and the reproduced data are intermittently performed.

The data written in the buffer memory 13 is read by the memory controller 12 at such a timing when the transfer rate of the reproduced data becomes 0.3M bit/sec, and then the read data is supplied into an encoder/decoder unit 14. The digital data supplied to the encoder/decoder unit 14 is processed in this encoder/decoder unit 14 by way of such a reproduction signal process as the decoding process for the audio compression process. The resultant digital data is D/A-converted into a corresponding analog signal by a D/A converter 15. The analog signal outputted from the D/A converter 15, i.e., the analog audio signal in this case, is supplied from an analog output terminal 16A to an external amplifier circuit unit so as to be amplified. The amplified signal is reproduced from a speaker and the like, for example, outputted as analog audio signals in an L-channel and a R-channel. Otherwise, the digital signal outputted from the encoder/decoder unit 14 is supplied to a digital output 16B as a digital audio signal.

In this case, the data read/write operation to the buffer memory 13 is carried out by designating addresses by the memory controller 12 under read/write pointer control. As previously explained, the write pointer (write address) is incremented at the timing of 1.4M bit/sec, whereas the read pointer (read address) is incremented at the timing of 0.3M bit/sec. Due to the difference between the write bit rate and the read bit rate, a certain amount of data have been stored in the buffer memory 13. At a time when the data have been stored in the buffer memory 13 up to the full memory capacity of this buffer memory 13, the increment of the write pointer is stopped, and the data readout operation from the magneto optical disk 1 by the optical head 3 is also stopped. It should be noted that the increment of the read pointer is continuously executed, the reproduced audio (sound) output is not interrupted.

Thereafter, only the data readout operation from the buffer memory 13 is continued. Assuming now that the data stored amount of the buffer memory 13 becomes lower than a predetermined data amount, both of the data readout operation from the disk 1 by the optical head 3 and the increment of the write pointer are restarted, so that the data are again commenced to be stored into the buffer memory 13.

As described above, since the acoustic signal is outputted as the reproduction output via the buffer memory 13, even when, for example, an external disturbance is applied to the recording and/or reproducing apparatus to disturb the tracking servo control, the reproduced output is not interrupted. While the data remain in the buffer memory 13, for example, the scanning position by the optical head 3 may access to the correct tracking position before the tracking servo control was disturbed, and then the data readout operation from the disk 1 is restarted, so that the recording and/or reproducing operation can be continued without giving an adverse influence to the reproduced output. That is, the vibration proof function can be considerably increased.

The address information derived from the disk 1, and the subcode data used for the control operation, which are outputted from the address decoder 10, are supplied via the encoder/decoder unit 8 to the system controller 11 so as to be utilized to carry out various sorts of control operations.

Furthermore, also, a lock detecting signal of a PLL circuit for producing a bit clock of the recording/reproducing operation, and a monitor signal indicative of the dropout state of the frame sync signal of the reproduced data (R-channel and L-channel) are supplied to the system controller 11.

The system controller 11 outputs a laser control signal for controlling the operation of the laser diode of the optical head 3. In response to this laser control signal, the system controller 11 controls the laser output of the laser diode to turn it on or off and also can switch the laser output level to be relatively low during reproduction and relatively high during recording.

While the recording operation is executed to the magneto optical disk 1, the analog audio signal functioning as the recording signal supplied to the analog input terminal 17A is A/D-converted into a digital audio signal by an A/D converter 18. Thereafter, this digital audio signal is supplied to the encoder/decoder unit 14 to be processed by the audio compression encode process. Alternatively, a the digital audio signal is supplied from the digital input terminal 17D, and this digital audio signal is furnished to the encoder/decoder unit 14 so as to be similarly processed by way of the audio compression encode process.

The digital data compressed by the encoder/decoder unit 14 is once written into the buffer memory 13 by the memory controller 12, and then is read from this buffer memory 13 at a preselected timing. Then, the read digital data is supplied to the encoder/decoder unit 8. After this digital data has been encode-processed by way of the CIRC encode and the EFM modulation, the resultant digital data is supplied to the magnetic head drive circuit 6.

In response to the recording data which has been encode-processed by the encoder/decoder 8, the magnetic head drive circuit 6 supplies a magnetic head drive signal to the magnetic head 6a. That is, either N-vertical field, or S-vertical field is applied to the magneto optical disk 1 by the magnetic head 6a. At this time, the system controller 11 furnishes a laser control signal to the optical head 3 in order to output the optical beam having the recording level.

Reference numeral 19 indicates an operation input unit provided with user operation keys, and reference numeral 20 represents a display unit arranged by, for example, a liquid crystal display. In the operation input unit 19, there are provided, although not shown in the figures, a recording key, a reproducing key, a stop key, an X key, a fast-forward key, and a fast-return key for user manipulations.

When the recording and/or reproducing operation for the disk 1 is carried out, the management information, i.e., P-TOC (prerecorded TOC) information and U-TOC (user TOC) information recorded on the disk 1 must be read out. In response to these management information, the system controller 11 may judge an address of an area where the data on the disk 1 should be recorded, and also an address of an area when the data should be reproduced. This management information is held in the buffer memory 13. Accordingly, as will be explained later, in the buffer memory 13, the above-described buffer area for storing the recording data/reproduced data, and the area for holding these management information are separately set.

The system controller 11 reads these management information by executing the reproducing operation of the area located at the innermost peripheral portion of the disk 1, where the management information has been recorded when the disk 1 is mounted on the recording and/or reproducing apparatus. Then, the read management information is stored into the buffer memory 13 under control of the system controller 11. The management information stored in the buffer memory 13 may be referred by the system controller 11 when the subsequent recording/reproducing operation for this disk 1 is carried out.

The U-TOC information may be edited and rewritten in accordance with the data recording/erasing operations. Every time the data recording/erasing operations are performed, the system controller 11 carries out this editing process to the U-TOC information stored in the buffer memory 13, and rewrites the U-TOC information at a preselected timing in response to the editing operation of the U-TOC information also as to the U-TOC area of the disk 1.

2. Audio Data Sector

Figure 1:
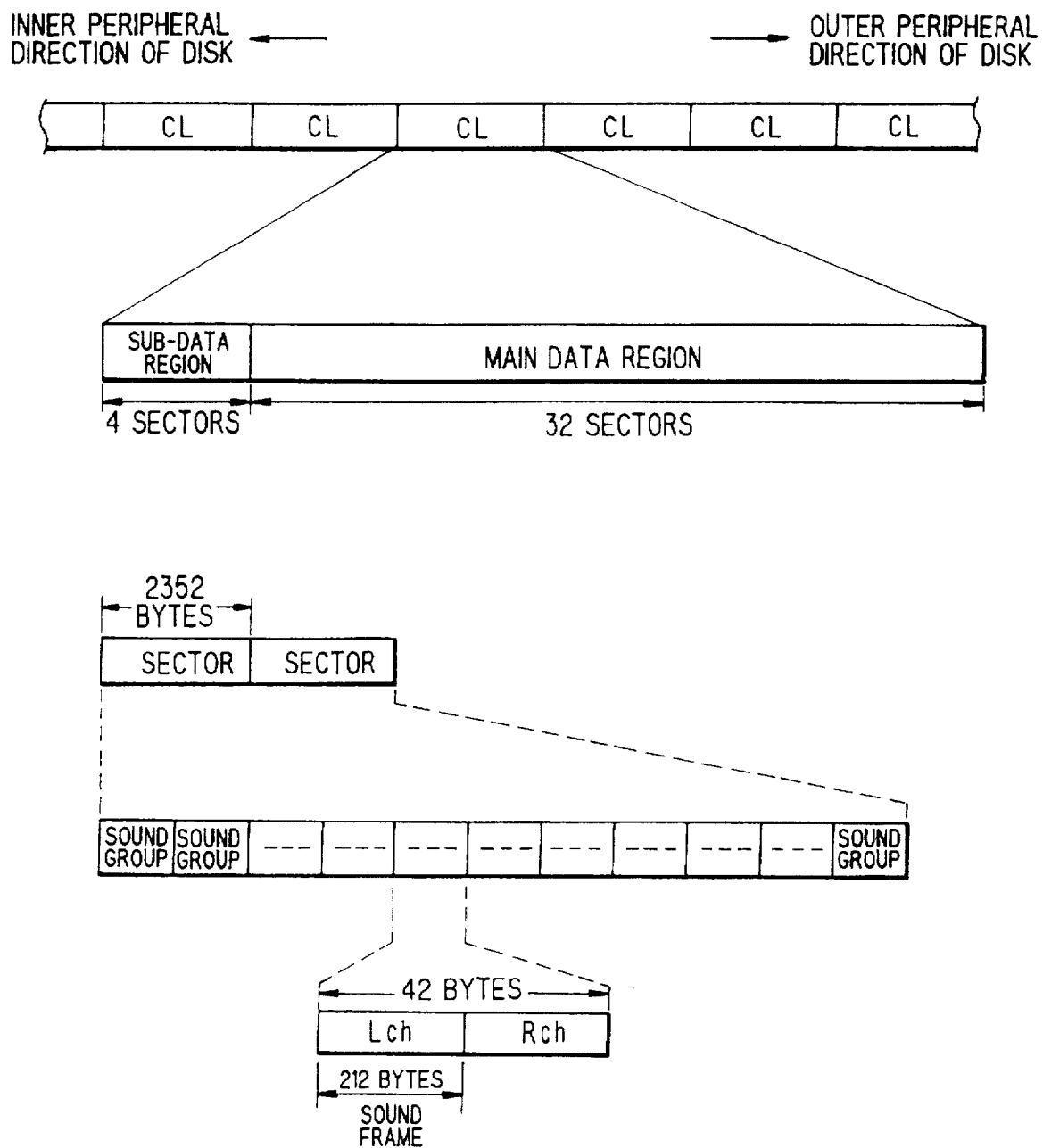
FIG. 1 pictorially shows a track format of a disk.
Figure 3:
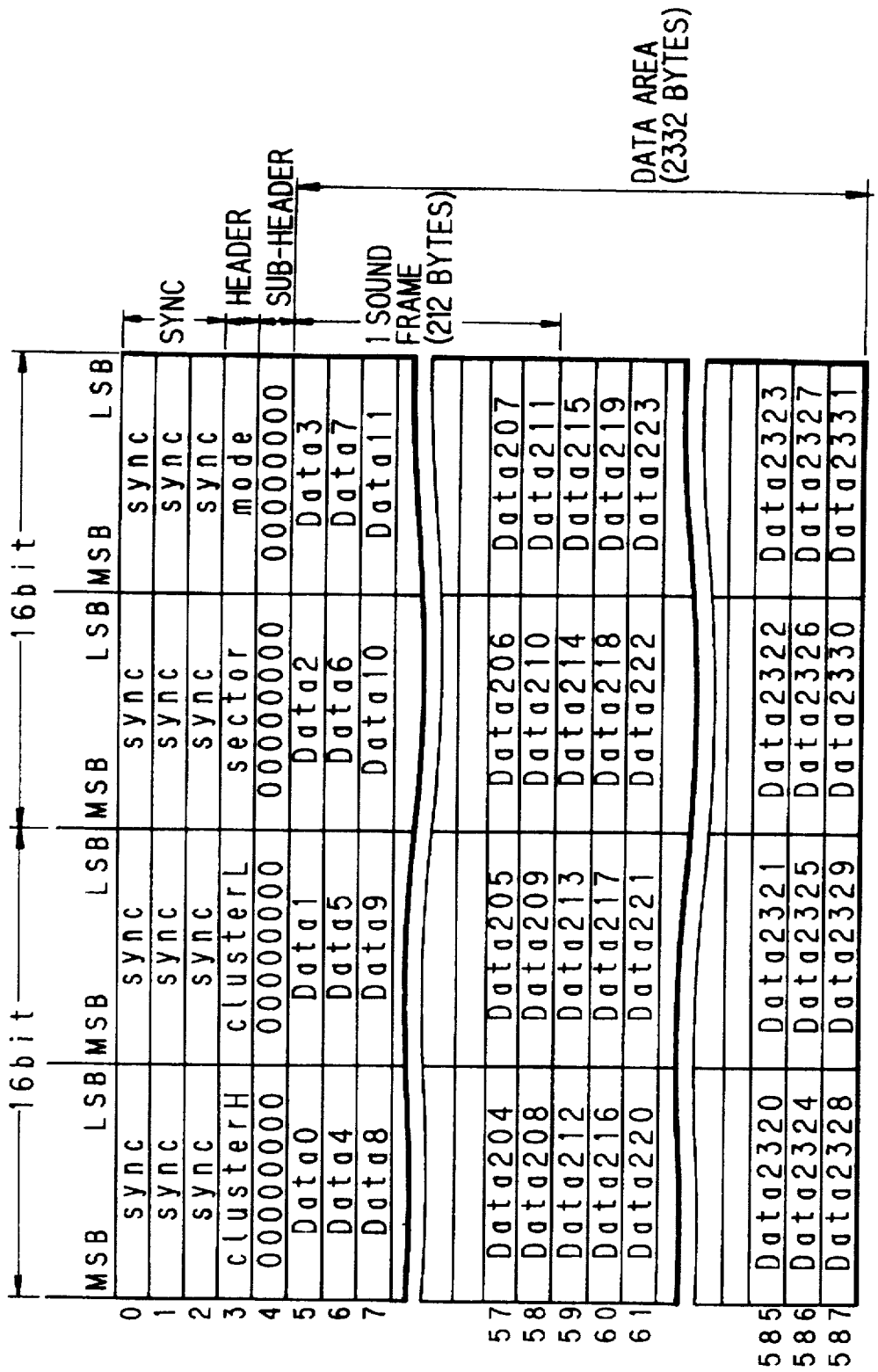
FIG. 3 pictorially represents a data sector of a disk.

As illustrated in FIG. 1, in the magneto optical disk employed in the recording and/or reproducing apparatus with such a structure, 32 sectors are present as a main data sector within 1 cluster. On the other hand, a format of a sector on which audio data is recorded is set as illustrated in FIG. 3.

In this sector (2,353 bytes), 12 bytes at a head portion are allocated as sync data. The subsequent 3 bytes are set to a cluster address and a sector address, and a further subsequent 1 byte is set to a mode, which thereby constitute a header.

Subsequent to this header, 4 bytes are set to a sub-header, and bytes subsequent to the sub-header, namely 2,332 bytes defined from a 21st byte to a 2,352nd byte are set to a data area (Data 0 to Data 2331).

In this data area of 2,332 bytes, 11 units of sound frames each constructed of 212 bytes are recorded, as illustrated in FIG. 1.

3. Storage Region of Buffer Memory

Figure 4:
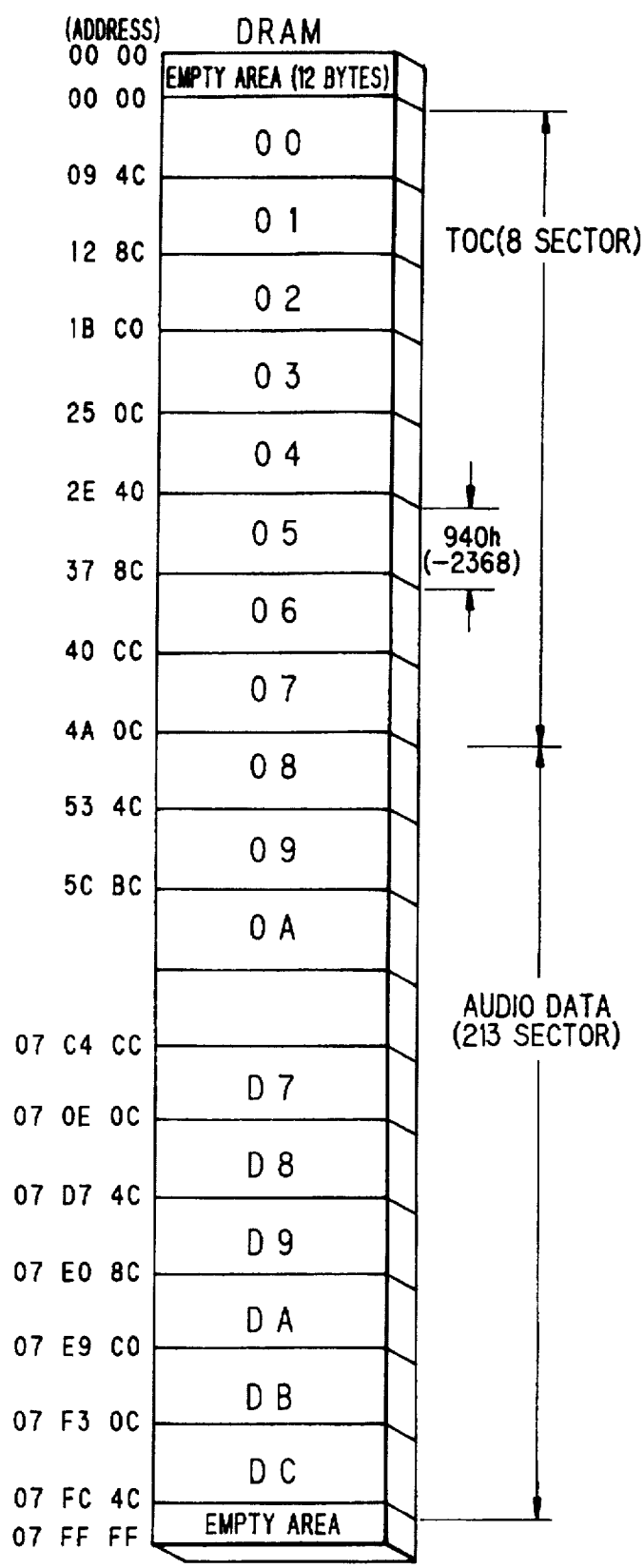
FIG. 4 is an explanatory diagram for showing a storage area of a buffer memory employed in the recording and/or reproducing apparatus according to the embodiment.

To store the data read from the disk 1 in the sector unit, in this embodiment, the buffer memory 13 has a storage area as shown in FIG. 4.

A storage capacity of the buffer memory 13 is set as 4M bits, which contains 8 sectors for holding the TOC information.

Thus, 12 bytes (addresses 0000h to 000Ch) at a head portion are set as an empty area. The subsequent 18,944 bytes from addresses 000Ch to 4A0Bh are used to store the TOC information. In other words, 8 areas defined from an area 00 to an area 07 are separately used to hold the TOC sector. Each area is 2,368 bytes. Therefore, additional data of 16 bytes in addition to the data of 1 sector equal to 2,352 bytes can be stored.

An area defined from addresses 4A0Ch to 07FC4Bh is used to store either the data read from the disk 1, or the data to be recorded on the disk 1. That is, the area 08 to the area DC, each having 2,368 bytes are employed as the store/read operations of the audio data sector. Here, each of these areas is equal to 2,368 bytes, and therefore, additional data of 16 bytes can be stored in addition to data for 1 sector equal to 2,352 bytes.

It should be noted that an area defined from addresses 07FC4Ch to 07FFFFh is used as an empty area.

The audio data read from the disk 1 are sequentially written into the area 08 through the area DC in the sector unit while incrementing the write pointer as to the addresses 4A0Ch to 07FC4Bh used to store the audio data. The audio data writing operation is continued from the area DC, returning to the area 08.

4. Operation During Normal Reproducing Operation

In this embodiment, operations to the buffer memory 13 during the normal reproducing operation will now be explained.

Figure 5:
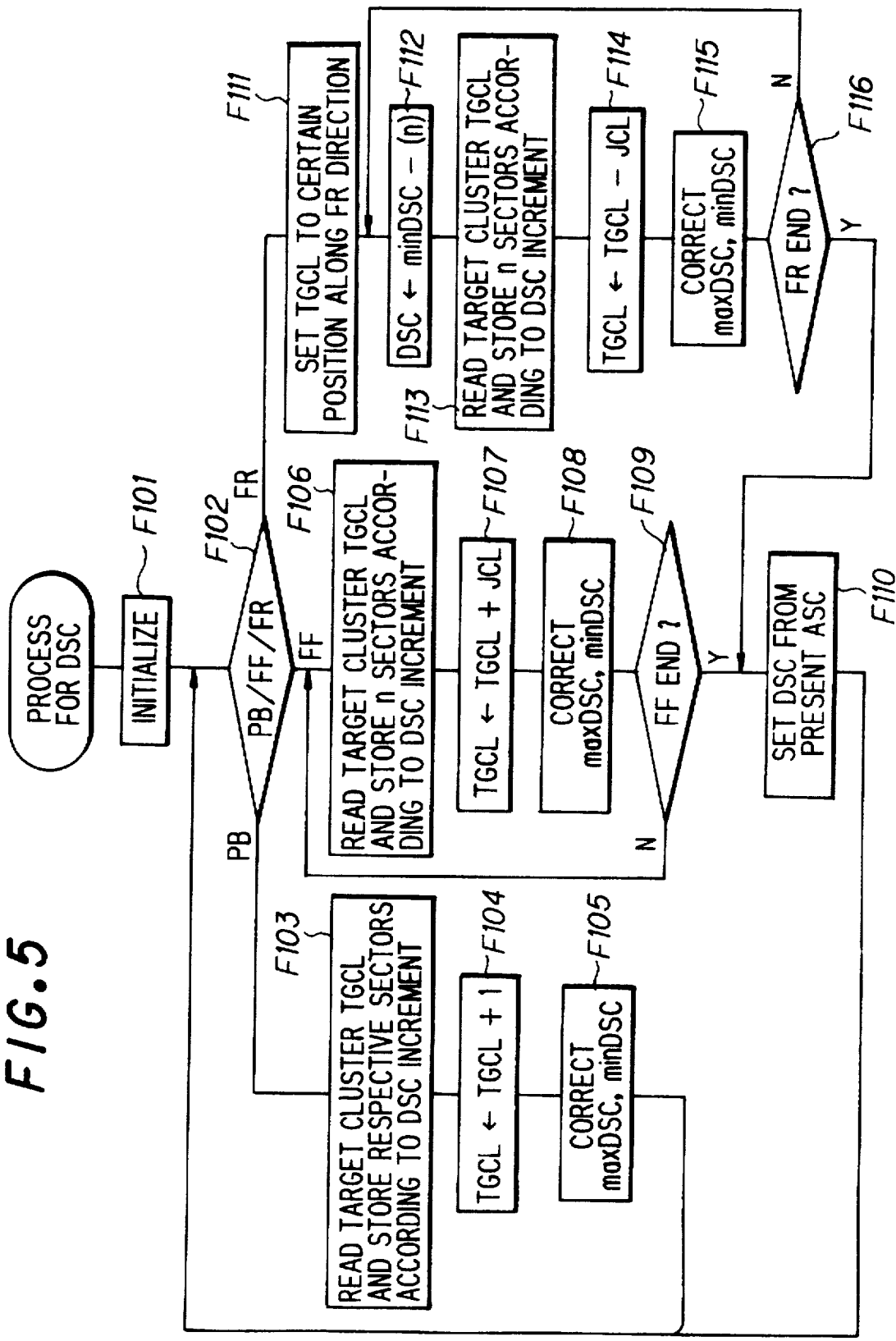
FIG. 5 is a flow chart for indicating a process operation of a sector counter provided at a disk drive side of a memory controller.
Figure 6:
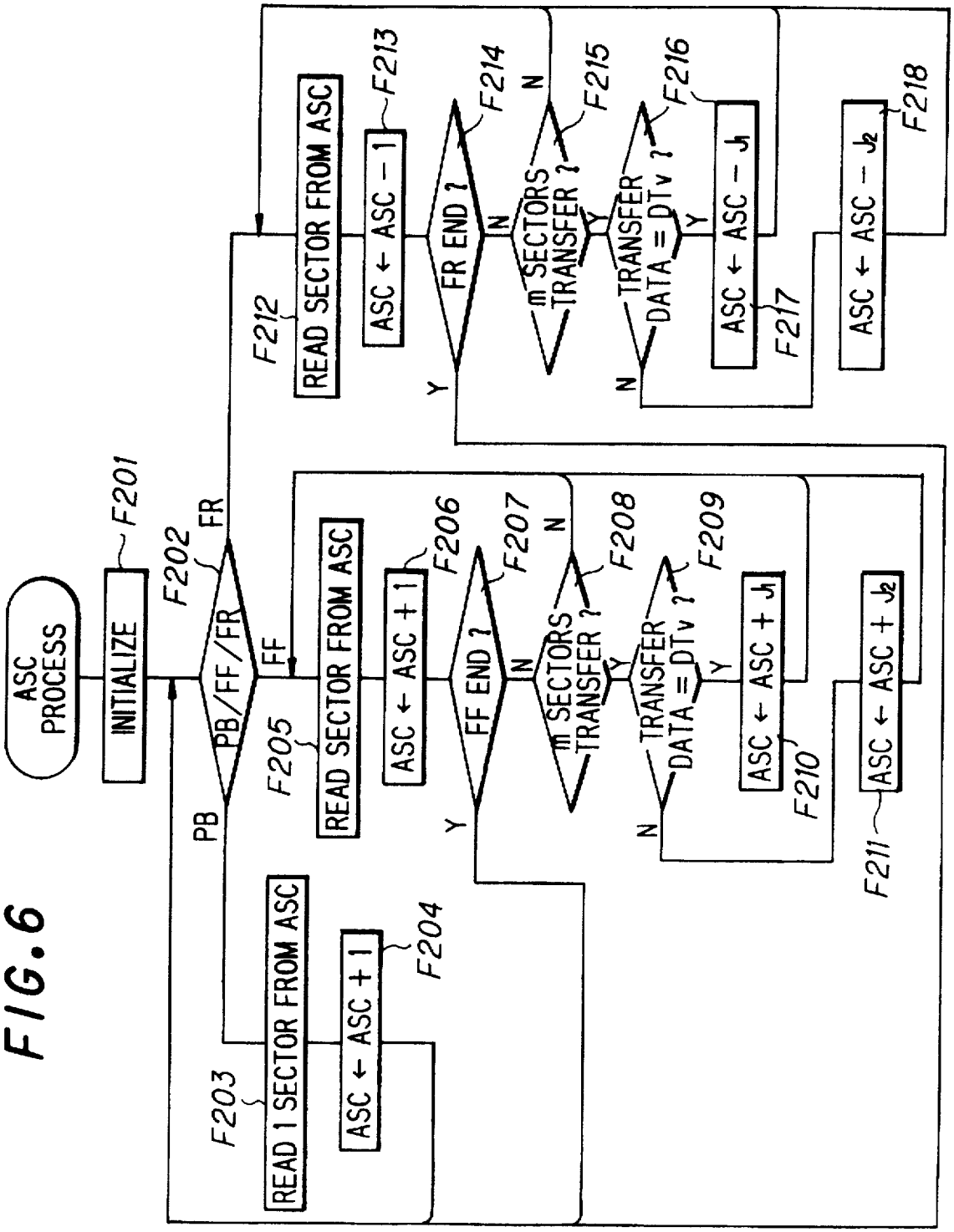
FIG. 6 is a flow chart for explaining a process operation of a sector counter provided at an audio (sound) compression encoder/decoder of the memory controller.

FIG. 5 represents the process for a "DSC" during normal reproducing operation, the fast-forward reproducing operation, and the fast-return reproducing operation as writing process operations of audio data read from the disk 1 into the buffer memory 13. FIG. 6 shows the operation of an "ASC" during the normal reproducing operation, the fast-forward reproducing operation, and the fast-return reproducing operation as reading process operations of audio data from the buffer memory 13.

The normal reproducing operation will be explained with reference to FIGS. 5, 6, 7(a) and 7(b).

In FIG. 5, a DSC (sector counter provided at the disk drive side) corresponds to a write pointer when the data is fetched from the disk 1 into the buffer memory 13. In FIG. 6, an ASC (sector counter provided at the audio compression encoder/decoder side) corresponds to a read pointer when the data is transferred from the buffer memory 13 to the audio compression encoder/decoder 14.

Both the process operation shown in FIG. 5 to the buffer memory 13 and the process operation shown in FIG. 6 to buffer memory 13 are independently carried out in a parallel manner by the memory controller 12.

As the process operation executed at the DCS side shown in FIG. 5, as an initializing operation, DSC, min DSC (effective limit position of DSC), max DSC (maximum position of DSC) are set to "0" or a specific position at step F101. As the process operation executed at the ASC side indicated in FIG. 6, as an initialization operation, ASC is set to "0" or a specific position at step F201.

During the reproducing operation, the process operation is advanced from the respective steps F102 and F202 to the process operation at the "PB" side.

At the DSC side, in response to a target cluster TGCL where a read starting position from the disk 1 is set, step F103, the system controller 11 controls the optical head 3 to read the audio data from the disk 1. The read audio data is stored into the buffer memory 13 in the sector unit at a high transfer rate in response to the increment operation of the DSC. At this time, the setting operations of min DSC and max DSC are corrected, if required (F103→F104→F105→F102→F103, . . . ).

On the other hand, on the ACS side, the audio data is read, at step F203, from the buffer memory 13 from an address indicated by the value of ASC in the sector unit at the low transfer rate. This reading operation is continued while incrementing the ASC (F203→F204→F202→F203, . . . ).

This condition is represented in FIG. 7a. FIGS. 7a and 7b schematically show such storage conditions that while incrementing the DSC, the audio data DTv for the normal reproducing operation is stored, and the stored audio data DTv for the normal reproducing operation is read out while incrementing the ASC. It should be understood that the audio data DTv for the normal reproducing operation implies such audio data which is read from the disk 1 by the above-explained normal reproducing operation and then is stored into the buffer memory 13. Accordingly, this definition is applied to the below-mentioned audio data DTv for the normal reproducing operation.

When the normal reproducing operation is further continuously performed, the storage condition shown in FIG. 7a is changed into the storage condition indicated in FIG. 7b.

The min DSC corresponding to the effective limit position of the DSC is first set to the DSC starting point, and thereafter is updated when the DSC is incremented in a ring form to rewrite the address of the min DSC. In other words, this min DSC indicates an address of audio data which becomes the temporally first data at each time instant as the audio data stored in the buffer memory 13.

During this normal reproducing operation, the audio data DTv read by the ASC is decoded by the audio compression encoder/decoder 14 to thereby be outputted as reproduced sounds.

5. Operation When Normal Reproducing Operation is changed into Fast-Forward Reproducing Operation When the normal reproducing operation is changed into the fast-forward reproducing operation, the process operation performed on the DSC side is advanced from the step F102 to the FF side, whereas the process operation performed on the ASC side is advanced from the step F202 to the FF side. During the fast-forward reproducing operation, in response to the control signal supplied from the system controller 11, the optical head 3 is transported at a high speed along the radial direction of the disk 1, for instance, from the inner peripheral side to the outer peripheral side of this disk. Also, track jumps are repeatedly performed, so that the data present at the track to which the optical head 3 jumps is read out from this track. Thus, the read data is stored in the buffer memory 13. The switching operation from the normal reproducing operation into either the fast-forward reproducing operation, or the fast-return reproducing operation (which be discussed later) is carried out by manipulating the corresponding key of the operation input unit 19.

As indicated in FIG. 8a, in the case that when the normal reproducing operation is executed, the operation is switched into the fast-forward reproducing operation, the audio data DTv for the normal reproducing operation is read from the buffer memory 13 from the ASC value at this time on the ASC side (see FIG. 8b). The ASC increment is directly executed to read the audio data DTv in the sector unit. This implies the process operation defined by steps F205, F206, F208 to F205, . . . , in the flow chart of FIG. 6.

After the audio data DTv for msectors have been read from the buffer memory 13, a jump value "$J_1$" is added to the ASC value, and then the audio data DTv for msectors are again read therefrom (F208→F209→F210).

In other words, as is apparent from FIG. 8b, the audio data OTv which have been stored into the buffer memory 13 during the normal reproducing operation are read with respect to msectors, and also the address jump operation for the jump value $J_1$ is carried out. Then, by repeating both of the audio data reading operation and the address jump operation, the sound reproduction is performed with employment of the audio data DTv for the normal reproducing operation, which are temporally continuous. As a consequence, just after the reproducing operation has been transferred to the fast-forward reproducing operation, the sounds reproduced by the fast-forward reproducing operation can be outputted without any sound interruption.

On the other hand, as indicated in FIG. 8b, in the case that the operation is transferred to the fast-forward reproducing operation at a halfway time instant of the previously stored audio data DTv, the audio data is continuously fetched from the disk 1 by employing the target cluster TGCL at this time on the DSC side. It should be noted all of the sectors of this target cluster TGCL are not fetched at this time, but the audio data for n sectors are read out from the disk 1 and then are stored into the buffer memory 13 while incrementing the DSC. As a consequence, as indicated as $FFDT_1$, audio data (n sectors) for the fast-forward reproducing operation, continued to the audio data DTv previously stored in the buffer memory 13, is stored (F106). It should be noted that the audio data for the fast-forward reproducing operation implies such data which has been read from the disk 1 while the optical head 3 is transported along the radial direction, namely the track jumping operation, and then has been stored into the memory 13.

Subsequently, in order to fetch the audio data for the fast-forward reproducing operation, the jump number JCL is added to the target cluster TGCL, and the next target cluster TGCL is set (F107). The next audio data $FFDT_2$ for the fast-forward reproducing operation is fetched by correcting the max DSC and the min DSC, if required (F108).

Subsequently, during the fast-forward reproducing operation, audio data $FFDT_3$, $FFDT_4$, . . . , for the fast-forward reproducing operation are fetched into the buffer memory 13.

The audio data for n sectors among this audio data FFDTX for the fast-forward reproducing operation corresponds to temporally continued audio data, whereas the audio data FFDTX is not temporally continued to the audio data $FFDT_{x+1}$.

It should be noted that in the embodiment, n is set to 9 sectors and m is set to 5 sectors.

On the ASC side, during the fast-forward reproducing operation, the audio data for m sectors is first read with respect to the audio data DTV for the normal reproducing operation, and the sound is outputted during the fast-forward reproducing operation by $J_1$ the address jump. Since the ASC is directly counted out, the audio data $FFDT_1$ for the fast-forward reproducing operation is re ad out. Here, since the respective audio data FFDTx for the fast-forward reproducing operation are not temporally continued, even when the ASC is incremented by every 1 sector to read the audio data, the sound during the fast-forward reproducing operation is obtained. However, since n sectors are continued, assuming now that this is 9 sectors, not so rhythmical sound for the fast-forward reproducing operation can be reproduced. Therefore, according to this embodiment, even when the audio data reading operation based upon the ASC is carried out for the audio data FFDTx for the fast-forward reproducing operation, the audio data for m sectors is read and the address jump is carried out (F205 to F208). As a consequence, even when the audio data for 9 sectors is continuously fetched on the DSC side, for instance, only the audio data for 5 sectors are reproduced to output the sound based on the fast-forward reproducing operation, so that the rhythmical sound can be outputted.

It should be noted that as to the address jump number, as a result of a judgement at a step F209, after the reproduced audio data becomes the audio data FFDTX for the fast-forward reproducing operation, it is set to $J_2$ (namely, $J_2 < J_1$) at a step F211.

6. Operation When Fast-Forward Reproducing Operation is changed into Normal Reproducing Operation When the fast-forward reproducing operation is to be changed into the normal reproducing operation, the process operation executed on the ASC side is returned from the step F207 to the step F202 shown in FIG. 6, and process operations defined in steps F203 and F204 will now be carried out. That is, as the counter value of the ASC, the counter value obtained when this fast-forward reproducing operation is ended directly succeeds. It should be noted that the switching operation from either the fast-forward reproducing operation, or the fast-return reproducing operation (which will be discussed later) into the normal reproducing operation is carried out by manipulating the keys of the operation in above-described similar manner to the above-described operation.

On the other hand, as the process operation executed on the DSC side, the process operation is advanced from the step F109 to a step F110 in FIG. 5. First, based on the present counter value of the ASC, the counter value of the DSC is again set. The process operation is transferred from the step F102 to process operations defined at steps F103, F104 and F105.

This transfer operation will now be explained based upon two examples indicated in FIGS. 9(a) and 9(b), and also FIGS. 10(a) and 10(b).

Figures 9A, 9B:
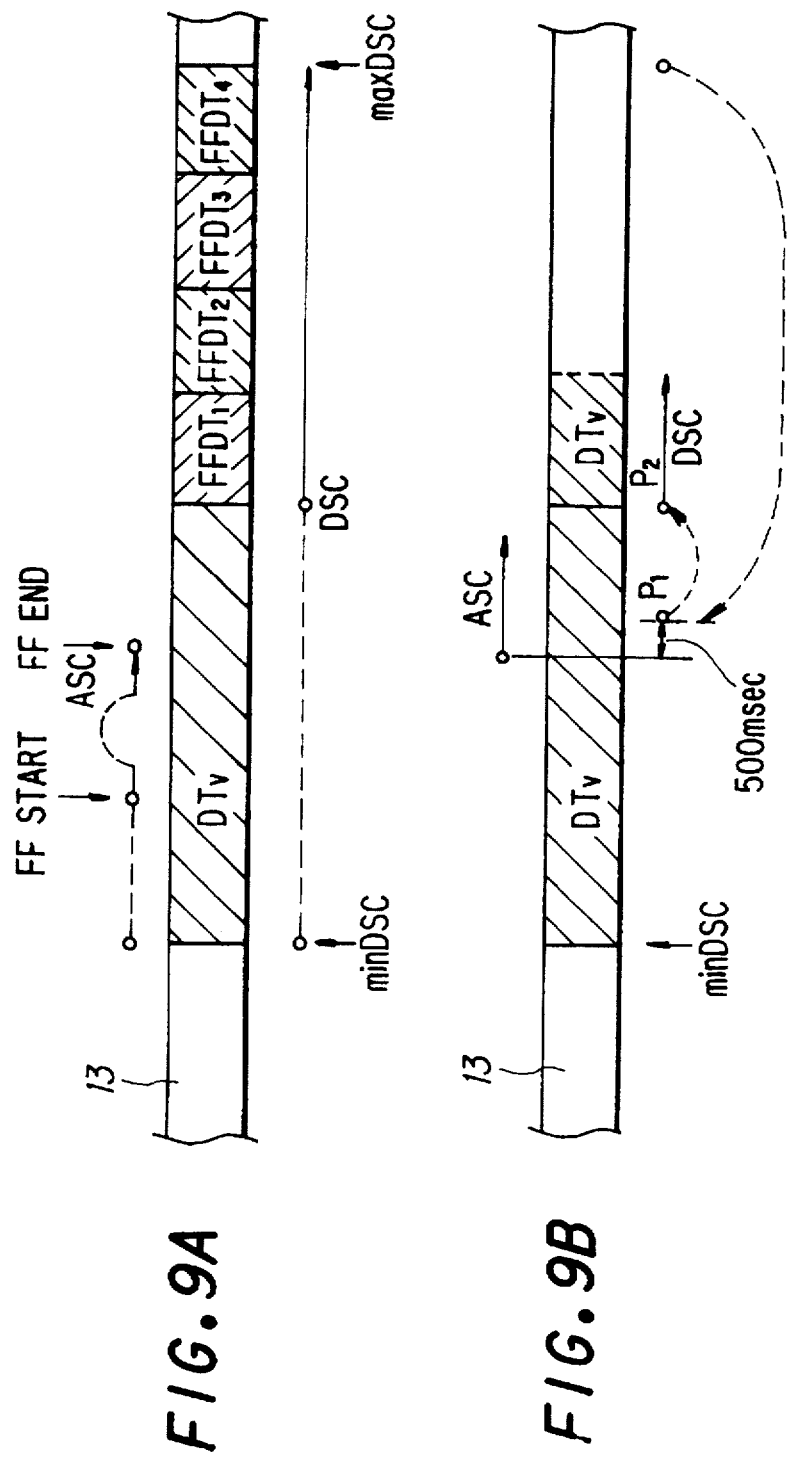
FIG. 9a and FIG. 9b are explanatory diagrams for describing a first operation example of the buffer memory when the fast-forward reproducing operation is changed to the normal reproducing operation in the recording and/or reproducing apparatus according to the embodiment.

A first example is such a case that, as indicated in FIG. 9(a), after the fast-forward reproducing operation is commenced, the fast-return reproducing operation is complete at a time instant when the audio data DTv for the normal reproducing operation are still read on the ASC side.

At this time, as illustrated in FIG. 9(a), the normal reproducing operation is commenced from the counter value at this time on the ASC side. In other words, when the counter value of the ASC is incremented by every 1 sector, the audio data is read from the buffer memory 13 for every preselected time period. As a consequence, the sound produced from the normal reproducing operation can be outputted without any sound interruption immediately after the process operation has been transferred to the normal reproducing operation.

On the other hand, even if the audio data $FDT_4$ for the fast-forward reproducing operation has been acquired into the buffer memory 13 on the DSC side, the present counter value of the DSC is not directly used, but is again set at the step F110 shown in FIG. 5.

That is, as shown in FIG. 9(b), a confirmation is made of such audio data stored at an address P1213, which is read at 500 msec after the present counter value of the ASC.

Here, an address comparison is carried out between a sector at an address $P_1$ and a sector at an address $(P_1-1)$. If the sectors are not temporally continuous, then the data in the sector to be stored at the address $P_1$ is stored. Namely, the data previously stored in the buffer memory 13, for example, the data continued to the audio data DTv stored on the disk 1 is read out from this disk 1 to be stored into the buffer memory 13. If the sector at the address $P_1$ is temporally continuous to the sector at the address $(P_1-1)$, then a confirmation is made of the temporal continuity of the sectors as to the subsequent addresses $(P_1+1)$, $(P_1+2)$, . . . , and then a point where the continuity is interrupted is searched. The judgement as to whether or not the preceding sector (e.g., sector as address "$P_1-1$") is temporally continuous to the succeeding sector (e.g., sector at address "$P_1$") is carried out by the system controller 12 to check the temporal continuity between the address data such as the sector address of the data stored in the preceding sector and the address data such as the sector address of the data stored in the succeeding sector. For instance, if the address data of the data stored in the preceding sector is very far from the address data of the data stored in the succeeding sector, then it may be judged that both of these address data are not temporally continuous. To the contrary, if the sector of the address $P_1$ is temporally continuous to the sector of the address $(P_1-1)$, then another confirmation is made of the temporal continuities as to the subsequent address $(P_1+1)$, $(P_1+2)$, . . . , and a point where the temporal continuities are interrupted is searched. On the other hand, when the audio data is written, or read in/from the buffer memory 13 in 1 cluster unit in the recording/reproducing apparatus of this embodiment, such a judgement may be made. That is, for example, if the cluster addresses of the address data after 500 msec are coincident with each other, then they are temporally continuous. Otherwise, if the continuity is established in the lower-digit sector address of the cluster address, then they are temporally continuous. The point where the temporal continuities are interrupted as shown in FIG. 9(b), corresponds to a boundary between the audio data DTv for the normal reproducing operation and the audio data FFDT₁ for the fast-forward reproducing operation as to the stored data. As a result, as shown in FIG. 9(b), the DSC is set so as to correspond to the address P₂, and the data readout operation from the disk 1 is restarted, so that the audio data for the normal reproducing operation are acquired into the buffer memory 13 so as to obtain the temporal continuity.

It should be understood that the temporal continuity would be interrupted as the sector data which have been stored at the addresses from the present ASC value after 500 msec. In this case, the sounds produced by the fast-forward reproducing operation would be outputted at this continuity interrupt portion. However, since this corresponds to a very short time period after the fast-forward reproducing operation is ended, there is no practical problem.

A second example implies such a case that as indicated in FIG. 10(a), after the fast-forward reproducing operation is started, the fast-forward reproducing operation is ended at a time instant when the audio data FFDT₂ for the fast-forward reproducing operation is read out on the ASC side.

At this time, as indicated in FIG. 10(a), on the ASC side, the normal reproducing operation is commenced at a time instant when the fast-forward reproducing operation is accomplished. That is, while the counter value of the ASC is incremented by every 1 sector, the audio data is read for a every predetermined time from the buffer memory 13. As a consequence, the sounds produced by the normal reproducing operation are outputted without any sound interrupt immediately after the operation is transferred to the normal reproducing operation. In particular, since as to the audio data FFDTx for the fast-forward reproducing operation, the audio data for the relatively long "n" sectors are fetched, even when the audio data FFDTx f or the fast-forward reproducing operation is read out to some extent after the operation has been transferred to the normal reproducing operation, and the audio data can be outputted as the sound output produced by the normal reproducing operation.

On the other hand, even if the audio data FDT₄ for the fast-forward reproducing operation has been acquired into the buffer memory 13 on the DSC side, the present counter value of the DSC is not directly used, but is again set at the step F110 shown in FIG. 5.

That is, as shown in FIG. 10(b), a confirmation is made of such audio data stored at an address P₁, which is read at 500 msec after the present counter value of the ASC.

Here, an address comparison is carried out between a sector at an address P₃ and a sector at an address (P₃−1). If the sectors are not temporally continuous, then the data in the sector to be stored at the address P₃ is stored. Namely, the data previously stored in the buffer memory 13, for example, the data temporally continuous to the audio data FFDT₃ is read out from this disk 1 to be stored into the buffer memory 13. If the sector at the address P₃ is temporally continuous to the sector at the address (P₃−1), then a confirmation is made of the continuity of the sectors as to the subsequent addresses (P₃+1), (P₃+2), . . . , and then a point where the temporal continuity is interrupted is searched. The method for searching the point where the temporal continuity is interrupted may be performed by employing the method as explained in, for example, FIGS. 9(a) and 9(b). The point where the temporal continuities are interrupted as shown in FIG. 10(b), corresponds to a boundary between the audio data FFDT₃ and the audio data FFDT₄ for the fast-forward reproducing operation as to the stored data. As a result, as shown in FIG. 10(b), the DSC is set so as to correspond to the address P₄, and the data readout operation from the disk 1 is restarted, so that the audio data DTv for the normal reproducing operation are acquired into the buffer memory 13 so as to obtain the temporal continuity from the audio data FFDT₄ for the fast-forward reproducing operation.

It should be understood that the temporal continuity would be interrupted at the boundary between the data FFDT₂ and the data FFDT₃ for the fast-forward reproducing operation in this case as the sector data which have been stored at the addresses from the present ASC value after 500 msec. In this case, the sounds produced by the fast-forward reproducing operation would be outputted at this continuity interrupt portion. However, since this corresponds to a very short time period after the fast-forward reproducing operation is ended, there is no practical problem.

7. Operation When Normal Reproducing Operation is changed into Fast-Return Reproducing Operation When the normal reproducing operation is changed into the fast-return reproducing operation, the process operation executed on the DSC side is advanced from the step F102 to the FR side, and the process operation executed on the ASC side is advanced from the step F202 to the FR side. During the fast-return reproducing operation, the optical head 3 is transported at a high speed along the radial direction of the disk 1, for instance, along such a direction from the outer peripheral portion of the disk to the inner peripheral portion thereof in response to the control signal derived from the system controller 11. Also, track jumps are repeated, so that the data stored in the track to which the optical head 3 jumps is read out. Thus, the read data is stored in the buffer memory 13.

Figures 11A, 11B:
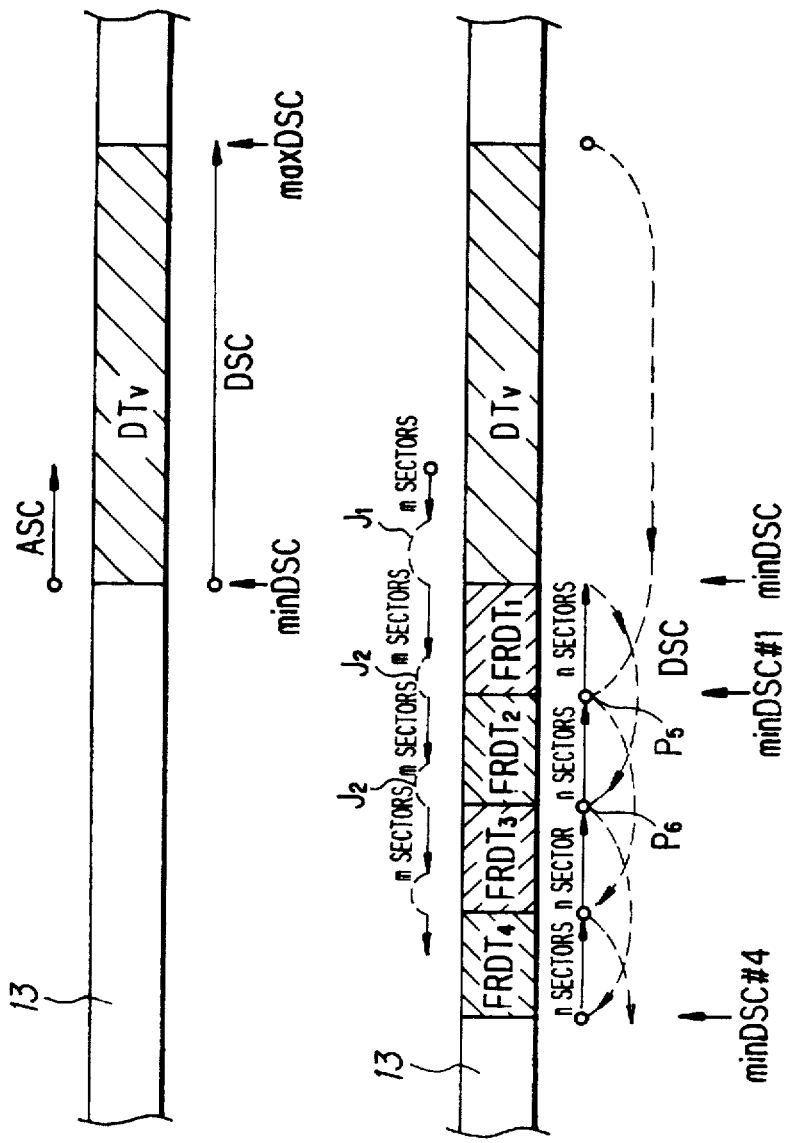
FIG. 11a and FIG. 11b are explanatory diagrams for describing operation of the buffer memory when the normal reproducing operation is changed to the fast-return reproducing operation in the recording and/or reproducing apparatus according to the embodiment.

As indicated in FIG. 11a in the case that when the normal reproducing operation is executed, the operation is switched into the fast-return reproducing operation, the audio data DTv for the normal reproducing operation is read from the buffer memory 13 from the ASC value at this time on the ASC side (see FIG. 11b). The ASC increment is directly executed to read the audio data DTv in the sector unit. This implies the process operation defined by steps F212, F213, F215 to F212, . . . , in the flow chart of FIG. 6.

After the audio data DTv for msectors have been read from the buffer memory 13 along the reverse direction, a jump value "J₁" is subtracted from the ASC value, and then the audio data DTv for msectors are again read therefrom along the reverse direction (F215→F216→F217).

In other words, as is apparent from FIG. 11c, the audio data DTv which have been stored into the buffer memory 13 as the data for the normal reproducing operation are read with respect to msectors along the reverse direction, and also the read address jump operation for the jump value J₁ is carried out along the reverse direction. Then, by repeating both of the audio data reading operation and the address jump operation, the sound reproduction is performed with employment of the audio data DTv for the normal reproducing operation, which are temporally continuous. As a consequence, just after the reproducing operation has been transferred to the fast-return reproducing operation, the sounds reproduced by the fast-return reproducing operation can be outputted without any sound interruption.

On the other hand, as indicated in FIG. 11b, in the case that the operation is transferred to the fast-return reproducing operation at a halfway time instant of the previously stored audio data DTv, the target cluster TGCL is set to a predetermined position along the fast-return reproducing direction as the read position from the disk 1. This implies that such a cluster is set for the audio data temporally before the audio data stored in the min DSC at this time (F111).

Next, the counter value of the DSC is set as a value of min DSC-(n). In other words, it is set as a value corresponding to the address $P_5$ of FIG. 11a. In response to the target cluster TGCL, the audio data read out from the disk 1 is fetched into the buffer memory 13. It should be noted that all of the sectors of this target cluster TGCL are not fetched at this time, but the audio data for n sectors are read out from the disk 1 and then are stored into the buffer memory 13 while incrementing the DSC. As a consequence, as indicated as $FFDT_1$, audio data (n sectors) for the fast-return reproducing operation is stored at step F113. It should be noted that the audio data for the fast-return reproducing operation implies such data which has been read from the disk 1 while the optical head 3 is transported along the radial direction, for example, a direction opposite to that of the fast-forward reproducing operation, and then has been stored into the memory 13.

Subsequently, in order to fetch the audio data for the fast-return reproducing operation, the jump number JCL is subtracted from the target cluster TGCL, and the next target cluster TGCL is set at step F114. The max DSC and the min DSC are corrected, if required at step F115. At this time, the min DSC is again set to the address $P_5$ as indicated as min DSC #1.

Then, the process operation is returned to the step F112 at which the DSC is again set in order to fetch the next audio data $FFDT_2$ for the fast-return reproducing operation. In other words, the DSC is set to a point $P_6$ located before the min DSC #1 at this time by n sectors.

Thereafter, during the fast-return reproducing operation, the audio data $FRDT_2$, $FRDT_3 < FRDT_4$, . . . , for the fast-return reproducing operation are sequentially, and temporally returned, and are fetched for every n sectors. Also in the buffer memory 13, these data are acquired at the address positions which are temporally returned. It should be noted as to the n sectors within the respective audio data T-RDTx for the fast-return reproducing operations, these data are stored while the DSC is incremented. These audio data are continued in the same temporal order as that of the normal reproducing operation.

The audio data for n sectors among this audio data FRDTx for the fast-return reproducing operation corresponds to temporally continuous audio data, whereas the audio data FRDTx is not temporally continuous to the audio data $FRDT_{x+1}$.

On the ASC side, during the fast-return reproducing operation, the audio data for msectors is first read with respect to the audio data DTv for the normal reproducing operation, and the sound is outputted during the fast-return reproducing operation by the $J_1$ address jump. Since the ASC is directly counted out along the return direction, the audio data $FRDT_1$ for the fast-return reproducing operation is read out. Here, since the respective audio data FRDTx for the fast-return reproducing operation are not temporally continuous, even when the ASC is incremented by every 1 sector to read the audio data, the sound during the fast-return reproducing operation is obtained. However, according to this embodiment, even when the audio data reading operation based upon the ASC is carried out for the audio data FRDTx for the fast-return reproducing operation, the audio data for msectors is read and the address jump is carried out (at steps F212 to F215). It should be noted that as to the address jump number along the return direction, as a result of a judgement at a step F216, after the reproduced audio data becomes the audio data FRDTx for the fast-return reproducing operation, it is set to $J_2$ (namely, $J_2 < J_1$) at step F218.

8. Operation When Fast-Return Reproducing Operation is changed into Normal Reproducing Operation When the fast-return reproducing operation is to be changed into the normal reproducing operation, the process operation executed on the ASC side is returned from the step F214 to the step F202 shown in FIG. 6, and process operations defined in steps F203 and F204 will now be carried out. That is, as the counter value of the ASC, the counter value obtained when this fast-return reproducing operation is ended is employed and the increment thereof is directly restarted, so that the data reading operation is commenced for every 1 sector.

On the other hand, as the process operation executed on the DSC side, the process operation is advanced from the step F116 to a step F110 in FIG. 5. First, based on the present counter value of the ASC, the counter value of the DSC is again set. The process operation is transferred from the step F102 to process operations defined at steps F103, F104 and F105.

This transfer operation will now be explained based upon two examples indicated in FIGS. 12(a) and 12(b), and also FIGS. 13(a) and 13 (b).

A third example is such a case that, as indicated in FIG. 12(a) after the fast-return reproducing operation is commenced, the fast-return reproducing operation is complete at a time instant when the audio data DTv for the normal reproducing operation are still read on the ASC side.

At this time, as illustrated in FIG. 12(b), the normal reproducing operation is commenced from the counter value at this time on the ASC side. When the counter value of the ASC is incremented by every 1 sector, the audio data is read from the buffer memory 13 for every preselected time period. As a consequence, the sound produced from the normal reproducing operation can be outputted without any sound interruption immediately after the process operation has been transferred to the normal reproducing operation. In other words, the data is read from the buffer memory 13 in a direction along which the time has elapsed from the temporally returned fast-return reproducing operation, and then the read data is reproduced.

On the other hand, the counter value used to acquire the audio data FRDT for the fast-forward reproducing operation is not directly used on the DSC side, but is again set at the step F110 shown in FIG. 5.

That is, as shown in FIG. 12(b), a confirmation is made of such audio data stored at an address $P_7$, which is read at 500 msec after the present counter value of the ASC.

Here, an address comparison is carried out between a sector at an address $P_7$ and a sector at an address $(P_7-1)$. If the sectors are not temporally continued, then the data in the sector to be stored at the address $P_7$ is stored. Namely, the data previously stored in the buffer memory 13, for example, the data continued to the audio data DTv stored on the disk 1 is read out from this disk 1 to be stored into the buffer memory 13. If the sector at the address $P_7$ is temporally continued to the sector at the address $(P_7+1)$, $(P_7+2)$, . . . , and then a point where the temporal continuity is interrupted is searched. The method for searching the point where the temporal continuity is interrupted is carried out by way of the methods, as previously explained with reference to FIGS. 9(a) and 9(b). In the example indicated in FIG. 12(b), the point where the temporal continuity is interrupted corresponds to such a point where the stored data DTv for the normal reproducing operation is ended. As a result, as shown in FIG. 12(b), the DSC is set so as to correspond to the address $P_8$, and the data readout operation from the disk 1 is restarted, so that the audio data for the normal reproducing operation are acquired into the buffer memory 13 so as to obtain the temporal continuity.

Figures 13A, 13B:
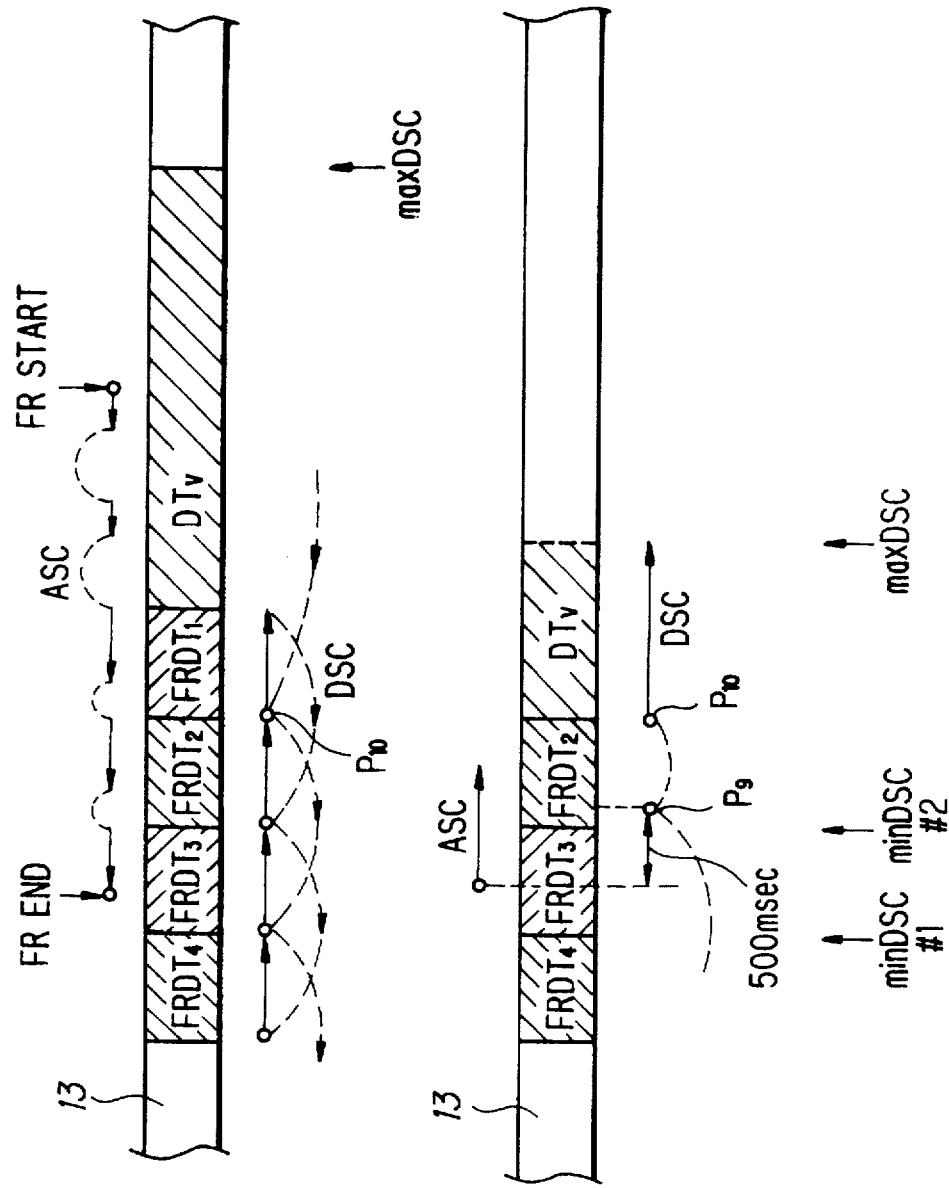
FIG. 13a and FIG. 13b are explanatory diagrams for describing a fourth operation example of the buffer memory when the fast-return reproducing operation is changed to the normal reproducing operation in the recording and/or reproducing apparatus according to the embodiment.

A fourth example implies such a case that as indicated in FIG. 13(a), after the fast-return reproducing operation is started, the fast-forward reproducing operation is ended at a time instant when the audio data $FRDT_3$ for the fast-forward reproducing operation is read out on the ASC side.

At this time, as indicated in FIG. 13(b), on the ASC side, the normal reproducing operation is commenced at a time instant when the fast-forward reproducing operation is accomplished. That is, while the counter value of the ASC is incremented by every 1 sector, the audio data is read for every predetermined time from the buffer memory 13. Since the respective sectors in the audio data $FRDT_3$ for the fast-return reproducing operation have been stored while the DSC is incremented (along the normal reproducing direction), the process operation is transferred to the normal reproducing operation. Thus, immediately after the ASC is changed from the decrement operation into the increment operation, the sound produced during the normal reproducing operation is outputted without any sound interruption. In particular, since as to the audio data FRDTX for the fast-return reproducing operation, the audio data for the relatively long "n" sectors are fetched, even when the audio data FRDTx for the fast-return reproducing operation is read out to some extent after the operation has been transferred to the normal reproducing operation, the audio data can be outputted as the sound output produced by the normal reproducing operation.

On the other hand, the counter value used to acquire the audio data FRDTX for the fast-return reproducing operation is not utilized on the DSC side, but is again set at the step F110 of FIG. 5.

That is, as shown in FIG. 13(b), a confirmation is made of such audio data stored at an address $P_9$, which is read at 500 msec after the present counter value of the ASC.

Here, an address comparison is carried out between a sector at an address $P_9$ and a sector at an address ($P_1$−1). If the sectors are not temporally continuous, then the data in the sector to be stored at the address $P_9$ is stored. Namely, the data on the disk 1, which is temporally continuous to the data of the sector at the address ($P_8$−1) stored in the buffer memory 13 is read out, and then the read data is stored into the buffer memory 13. If the sector at the address $P_9$ is temporally continuous t the sector at the address ($P_9$−1), then a confirmation is made of the temporal continuity of the sectors as to the sectors as to the subsequent addresses ($P_9$+1), ($P_9$+2), . . . , and then a point where the temporal continuity is interrupted is searched. The method for searching the point where the temporal continuity is interrupted is carried out by employing the methods as explained in FIGS. 9(a) and 9(b).

The point where the temporal continuities are interrupted as shown in FIG. 13(b), corresponds to an address $P_{10}$ of a boundary between the audio data $FRDT_1$ for the fast-return reproducing operation in FIG. 13(a).

Accordingly, the counter value of the DSC is set to a value corresponding to the address $P_{10}$, and the data writing operation from the disk 1 is restarted from this state. As represented in FIG. 13(b), the audio data is read out from the disk 1 in order to obtain the temporal continuity from the data $FRDT_2$ for the fast-return reproducing operation. Then, the read audio data is acquired into the buffer memory 13 as the data DTv for the normal reproducing operation.

It should be understood that the temporal continuity would be interrupted as the sector data which have been stored at the addresses from the present ASC value after 500 msec. In this case, the temporal continuity is interrupted at the boundary between the audio data $FRDT_3$ and $FRDT_2$ for the fast-return reproducing operation, and such a sound produced during the fast-return reproducing operation is outputted at this boundary portion. However, since this corresponds to a very short time period after the fast-return reproducing operation is ended, there is no practical problem.

As described above, in accordance with the present embodiment, when the normal reproducing operation is transferred to the highspeed reproducing operation such as the fast-forward reproducing operation, or the fast-return reproducing operation, the sound produced by the highspeed reproducing operation is first outputted by employing the audio data DTv for the normal reproducing operation, which has been stored in the buffer memory 13. As a consequence, no sound interruption occurs during the transfer operation between the reproducing operations, and smooth operation feelings can be realized.

When the reproducing operation is transferred from the highspeed reproducing operation such as the fast-forward reproducing operation or the fast-return reproducing operation into the normal reproducing operation, either the audio data DTv for the normal reproducing operation, or the audio data (FFDTx, FRDTx) for the fast-forward/fast-return reproducing operations, which has been stored in the buffer memory 13 at this time, is employed to reproduce the sounds. Accordingly, no sound interruption occurs during the transition of the reproducing operations, and smooth operation feelings can be realized.

It should be noted that while the various embodiments have been describe, the recording and/or reproducing apparatus according to the present invention is not limited to the above-described arrangements of these embodiments, and also the actual processing sequences are not restricted to those shown in FIGS. 5 and 6, but may be changed. Although the recording and/or reproducing apparatus using the magneto optical disk as the recording medium has been described in the above-described embodiment, the present invention may be similarly applied to such a recording and/or reproducing apparatus with using a tape-shaped magnetic medium such as a magnetic tape.

What is claimed is:

1. A reproducing apparatus for a recording medium, comprising:

reading means relatively moved with respect to a recording medium, for reading audio data recorded on the recording medium;

memory means for temporarily storing therein the audio data read from the recording medium by the reading means;

control means for controlling a writing operation of the audio data into the memory means and a reading operation of the audio data stored in the memory means, wherein the control means controls writing of the audio data into the memory means and reading of the audio data therefrom in such a manner that a writing speed of the audio data read by the reading means becomes higher than a reading speed of the audio data stored in the memory means; when a highspeed reproducing operation condition is set, the control means causes a highspeed reproducing operation process to be executed with employment of the audio data previously stored in the memory means; and after the highspeed reproducing operation process based on the audio data previously stored in the memory means has been completed, the control means relatively transports the reading means at a high speed with respect to the recording medium, whereby a highspeed reproducing operation process for the audio data which is read out from the recording medium to be written into the memory means is carried out;

wherein, when the highspeed reproducing operation condition is switched into a normal reproducing operation condition, the control means continuously reads the audio data stored in the memory means at a time instant when the highspeed reproducing operation condition is switched into the normal reproducing operation condition; and further wherein after the operation condition has been brought into said normal reproducing operation condition, said control means writes the audio data read from said recording medium into said memory means from a head position of the audio data having an address different from an address of the audio data read from said memory means at the time instant when said highspeed reproducing operation condition is switched into said normal reproducing operation condition.

2. A reproducing apparatus for a recording medium as claimed in claim 1 wherein:

said control means judges whether or not the address of the audio data read from said memory means at the time instant when said highspeed reproducing operation condition is changed into the normal reproducing operation condition is temporally continuous with an address of the audio data separated by a predetermined distance from said audio data read from the memory means at said changing time instant, whereby a head position of the audio data having said different address is determined.

3. A reproducing apparatus for a recording medium as claimed in claim 1 wherein:

said control means compares the address of the audio data read from said memory means at the time instant when said highspeed reproducing operation condition is changed into said normal reproducing operation condition with an address of the audio data separated by a predetermined distance from the audio data read from said memory means at said changing time instant; and when a comparison result implies that the address of said read audio data is not temporally continuous with the address of said audio data separated by said predetermined distance therefrom, said control means writes the audio data read from said reading means from said separated audio data at a head position.

4. A method for reproducing a recording medium in which audio data is recorded together with address data on a recording medium; the audio data read from the recording medium by reading means is once stored into a memory means; the audio data stored in the memory means is read; and the audio data is written into the memory means or read from the memory means in such a manner that a writing speed of the audio data read out from the recording medium is higher than a reading speed of the audio data stored in the memory means; comprising the steps of:

when a highspeed reproducing operation condition is set, executing a highspeed reproducing operation process with employment of the audio data previously stored in the memory means;

transporting the recording medium at a high speed with respect to the reading means and writing the audio data read by the reading means into the memory means continuously to the audio data previously stored in the memory means;

after the highspeed reproducing operation process for the audio data previously stored in the memory means is accomplished, transporting the recording medium at a high speed with respect to the reading means, whereby a highspeed reproducing operation process for the audio data which has been read from the recording medium and written into the memory means is carried out;

continuously reading the audio data stored in the memory means at a time instant when the highspeed reproducing operation condition is switched into the normal reproducing operation condition;

when said highspeed reproducing operation condition is switched into a normal reproducing operation condition, continuously reading the audio data stored in said memory means at a time instant when said highspeed reproducing operation condition is switched into the normal reproducing operation condition; and after the operation condition has been brought into said normal reproducing operation condition, of writing the audio data read from said recording medium into said memory means from a head position of the audio data having an address different from an address of the audio data read from said memory means at the time instant when said highspeed reproducing operation condition is switched into said normal reproducing operation condition.

5. A reproducing method as claimed in claim 4 further comprising the step of judging whether or not the address of the audio data read from said memory means at the time instant when said highspeed reproducing operation condition is changed into the normal reproducing operation condition is temporally continuous with an address of the audio data separated by a predetermined distance from said audio data read from the memory means at said changing time instant to thereby determine a head position of the audio data having said different address.

6. A reproducing apparatus for reproducing audio data from a recording medium, comprising:

reproducing means for reproducing the audio data from the recording medium;

memory means for temporarily storing therein the audio data supplied from the reproducing means;

searching operation means for indicating a searching operation to the reproducing means;

searching control means for controlling the reproducing means so as to perform a reproducing and moving operation alternately in accordance with operation of the searching operation means;

detecting means for detecting a joint point between stored temporally continuous audio data and intermittent audio data in accordance with continuity of addresses;

memory control means for controlling a writing operation of the audio data into the memory means and a reading operation of the audio data stored in the memory means, wherein the memory control means controls a write-pointer to write the audio data into the memory means and a read-pointer to continuously read the audio data from the memory means at a normal reproducing mode; and when the searching operation means is operated by a user, the memory control means controls the write-pointer intermittently, and at a moment of a shift to the normal reproducing mode from the searching operation mode, the memory control means controls the read-pointer to access the joint point between the stored temporally continuous audio data and the intermittent audio data.

7. A reproducing apparatus for a recording medium as claimed in claim 6 wherein:

when said searching operation means is operated by the user, said memory control means reads a preselected amount of said audio data stored in said memory means therefrom in a discontinuous manner.

8. A reproducing apparatus for a recording medium as claimed in claim 7 wherein:

when said searching operation means is operated by the user, said reproducing means moves with respect to the recording medium in such a manner that said audio data is read from the recording medium, whose data amount is larger than such a data amount of the audio data when said audio data stored in said memory means is read out therefrom.

9. A reproducing apparatus for a recording medium as claimed in claim 8 wherein:

when said searching operation means is operated by the user said reproducing means moves at a high speed with respect to the recording medium from such an address which is temporally continuous with the audio data previously stored in said memory means and is temporally located at a down stream side, whereby the audio data read from the recording medium is written into said memory means.

10. A reproducing apparatus for a recording medium as claimed in claim 6 wherein:

when said normal reproducing mode is selected by the user, the memory control means continuously reads the audio data stored in said memory means at a time instant when said searching operation mode is switched into the normal reproducing mode.

11. A reproducing method for reproducing audio data from a recording medium, comprising the steps of:

reproducing the audio data from the recording medium with a reproducing apparatus;

temporarily storing in a memory the reproduced audio data;

selecting a high speed searching operation of the reproducing apparatus;

controlling the reproducing apparatus so as to perform a reproducing and moving operation alternately in accordance with operation of the highspeed searching operation;

detecting in the memory a joint point between stored temporally continuous audio data and intermittent audio data in accordance with continuity of addresses;

controlling a writing operation of the audio data into the memory and a reading operation of the audio data stored in the memory with a write-pointer to write the audio data into the memory apparatus and a read-pointer to continuously read the audio data from the memory apparatus at a normal reproducing mode; and when the highspeed searching operation is selected by a user, controlling the write-pointer intermittently, and at a moment of a shift to the normal reproducing mode from the highspeed searching operation mode, controlling the read-pointer to access the joint point between the stored temporally continuous audio data and the intermittent audio data.

12. A reproducing method as claimed in claim 11 further comprising the step of reading in a discontinuous manner a preselected amount of the audio data stored in the memory when said highspeed searching operation condition is set.

13. A reproducing method as claimed in claim 12 further comprising the step of transporting the reproducing apparatus with respect to the recording medium, when the highspeed searching operation is set, in such a manner that the audio data is read from the recording medium, whose data amount is larger than such a data amount of the audio data when the audio data stored in the memory is read out therefrom.

14. A reproducing method as claimed in claim 13 wherein, when the highspeed searching operation is set, further comprising the step of transporting the reproducing apparatus at a high speed with respect to the recording medium from such an address which is continuous to the audio data previously stored in the memory and is temporally located at a down stream side to thereby write the audio data read from the recording medium into the memory.

15. A reproducing method as claimed in claim 11 wherein:

when said highspeed searching operation condition is switched into a normal searching operation condition, continuously reading the audio data stored in said memory means at a time instant when said highspeed searching operation condition is switched into the normal searching operation condition.

* * * * *